United States Patent
McArdle et al.

(10) Patent No.: US 11,203,706 B1
(45) Date of Patent: Dec. 21, 2021

(54) METHOD FOR MAKING AGGLOMERATE PARTICLES

(71) Applicants: James L McArdle, Wilson, WI (US); Clint A Howle, Springdale, AR (US); Carl G Cabot, Jr., Bentonville, AR (US)

(72) Inventors: James L McArdle, Wilson, WI (US); Clint A Howle, Springdale, AR (US); Carl G Cabot, Jr., Bentonville, AR (US)

(73) Assignee: AMERIPOLISH Inc., Lowell, AR (US)

( * ) Notice: Subject to any disclaimer, the term of this patent is extended or adjusted under 35 U.S.C. 154(b) by 841 days.

(21) Appl. No.: 15/883,695

(22) Filed: Jan. 30, 2018

(51) Int. Cl.
 *C09K 3/14* (2006.01)
 *B24D 3/28* (2006.01)

(52) U.S. Cl.
 CPC .............. *C09K 3/1418* (2013.01); *B24D 3/28* (2013.01); *C01P 2004/61* (2013.01)

(58) Field of Classification Search
 CPC ...... C09K 3/1418; C09K 3/1472; B24D 3/28; C01P 2004/61; B29C 65/1406; B29C 67/02; B29C 67/06
 See application file for complete search history.

(56) References Cited

U.S. PATENT DOCUMENTS

| | | | | |
|---|---|---|---|---|
| 3,916,584 A | * | 11/1975 | Howard | C09K 3/1409 51/308 |
| 5,082,887 A | * | 1/1992 | Brown | D21H 19/40 524/413 |
| 2002/0090891 A1 | * | 7/2002 | Adefris | B24D 13/18 451/28 |
| 2004/0026833 A1 | * | 2/2004 | Culler | B24D 11/005 264/461 |
| 2007/0125998 A1 | * | 6/2007 | Bunce | B01J 19/088 257/40 |
| 2008/0029924 A1 | * | 2/2008 | Maezawa | B29C 67/06 264/117 |
| 2008/0172951 A1 | * | 7/2008 | Starling | B24D 11/00 51/308 |

* cited by examiner

*Primary Examiner* — Pegah Parvini
(74) *Attorney, Agent, or Firm* — Isaac Angres (57) ABSTRACT

The invention provides a method for making agglomerate particles, said method comprising: (a) forming by mixing at high speed a slurry of mineral agglomerate components in a polymerizable liquid resin carrier; (b) mixing said slurry with a non-miscible fluid to form discrete dispersed droplets; (c) exposing the discrete dispersed droplets to UVA radiation; (c) solidifying said droplets to form a multitude of solid particles; (d) isolating said solid particles and then firing said particles. The resulting size of the fired particles of the invention are estimated to be in the range from approximately 20 μm to approximately 500 μm.

18 Claims, 2 Drawing Sheets

METHOD FOR MAKING AGGLOMERATE PARTICLES

This application claims the priority benefit under 35 U.S.C. section 119 of U.S. Provisional Patent Application No. 62/427,811 entitled "Method For Making Agglomerate Particles" filed on Nov. 30, 2016; and which is in its entirety herein incorporated by reference.

FIELD OF THE INVENTION

This invention relates generally to agglomerates and processes for making. More specifically, it relates to abrasive agglomerates that can be used in a variety of abrasive articles, including bonded abrasives, coated abrasives, nonwoven abrasives, and abrasive brushes.

This invention further relates to abrasive agglomerates that can be used in a variety of abrasive articles, including bonded abrasives, coated abrasives, nonwoven abrasives, and abrasive brushes.

The instant invention is also directed to composite abrasive particles, also known as agglomerates, and their uses. Specifically, the invention discloses abrasive agglomerates comprising abrasive particles and a matrix, abrasive articles comprising the agglomerates, methods of manufacturing such abrasive agglomerates and articles, and methods of using such abrasive articles.

BACKGROUND OF THE INVENTION

Abrasive articles comprising abrasive particles are used to abrade and/or modify the surface of a wide variety of materials, commonly referred to as workpieces, in a wide variety of applications. These applications range from high pressure, high stock removal of metal forgings to polishing eyeglasses. There are a variety of abrasive particles (e.g., diamond particles, cubic boron nitride particles, fused abrasive particles (including fused alumina, heat treated fused alumina, fused alumina zirconia, and the like), and sintered, ceramic abrasive particles (including sol-gel-derived abrasive particles) known in the art. In some abrading applications, the abrasive particles are used in loose form (a slurry), while in others the particles are incorporated into abrasive products (including: bonded abrasives, coated abrasives and nonwoven abrasives). Bonded abrasives typically comprise a plurality of abrasive particles bonded together to form a shaped mass. Coated abrasives typically comprise a plurality of abrasive particles bonded to a backing. Nonwoven abrasives typically comprise a plurality of abrasive particles bonded onto and into a lofty, porous, nonwoven substrate. Typical bonding materials for bonded abrasives are organic binders, vitreous binders, and metallic binders, while for coated and nonwoven abrasives they are typically organic binders. Criteria used in selecting abrasive particles used for a particular abrading application typically include: abrading life, rate of cut, substrate surface finish, grinding efficiency, and product cost.

Abrasive particles have a wide range of properties that provide for their application in the abrasives industry. The selection of a particular type of abrasive particle generally depends on the physical properties of the particles, the workpiece to be abraded, the desired resulting surface condition, the performance properties of the abrasive particles, and the economics of selecting a particular abrasive particle for a specific application.

Aluminum oxide, or alumina, is one of the most popular abrasive particles used in the production of coated abrasives, e.g., sandpaper. Alumina is used for many applications, such as paint sanding, metal grinding, and plastic polishing. Silicon carbide, also a popular abrasive, is generally known as a sharper mineral than alumina, and is used mainly in woodworking, paint, and glass grinding applications. Diamond and cubic boron nitride, commonly called "superabrasives," are used to abrade very hard workpieces such as hardened steel, ceramic, cast iron, silicon wafers and stone. Diamond is typically the used for non-ferrous materials, while cubic boron nitride is typically used for ferrous materials like hardened steel. However, superabrasives such as diamond and cubic boron nitride can cost up to 1000 times more than conventional abrasive particles, i.e., aluminum oxide, and silicon carbide. Therefore, it is desirable to utilize the superabrasives to their full extent.

Agglomerates are composite particles of a plurality of abrasive particles bonded together by a binder matrix. During use, the agglomerates typically erode or break down and expel used single abrasive particles to expose new abrasive particles. Agglomerates can be used in abrasive articles such as coated abrasives, non-woven abrasives, and abrasive wheels and provide a long useful life of the abrasive article and efficient use of the abrasive particles.

Agglomerate particles may comprise discrete abrasive or other particles bonded together with organic material, or with sintered glass or other sintered ceramic material. Agglomerate abrasive particles are especially suited for grinding and polishing concrete, stone, and similar hard materials.

Additionally, abrasive grain agglomerates are known in many variations for some length of time and normally are used in connection with bonded abradants such as for example abrasive disks, or abradants on substrates such as for example abrading belts. Abrasive grain agglomerates are normally constructed from single abrasive grains, the primary particles that are bonded together by means of a binder into a abrasive grain agglomerate. As binding agents either organic or inorganic binders can be utilized, wherein phenol resins are oftentimes used as organic binders, while glass-like or ceramic binders are used as inorganic bonding agents.

The big advantage of abrasive grain agglomerates is in fact that finely grained abradants can be utilized as primary particles from which an agglomerate grain is then formed which, as compared to a single grain of comparable size, exhibits an entirely different wearing mechanism during the abrading- and wearing process. A single grain of comparable size, according to pressure conditions, either dulls during the abrading process, or it will be destroyed. In contrast, with the abrasive grain agglomerate, the abrading conditions are selected so that single grains break out from the compound, such that new cutting edges are constantly formed which lend the agglomerate grain a long life expectancy while showing a cool smoothness and a homogenously polished section. A further advantage of the abrasive grain agglomerate is that in this manner, the finest abrasive grains can be utilized for abrading processes and abrading tools, for which they are otherwise not suited due to their small grain size.

Typically, agglomerate abrasive particles are produced in two steps. The first step requires formation of agglomerate precursor particles, which include abrasive particles, glass or other ceramic binder material, and a temporary organic binder. The temporary binder holds together the abrasive and ceramic binder materials, and permits shaping of the agglomerate particle. In some cases, agglomerate precursor particles may be used as produced, with no additional processing. Optionally in a second step, agglomerate precursor particles are heated to remove the temporary binder and to cause the glass or other ceramic binder material to sinter into a consolidated mass, thus holding the abrasive particles together in a composite particle structure. Sintered or fired agglomerate particles are then incorporated into abrasive articles used for grinding and polishing hard materials to high aesthetic quality.

The procedure for forming agglomerate precursor particles typically utilizes atomization and drying of liquid slurry precursors by well-known methods such as spray-drying, which are energy-intensive. Furthermore, atomization processes limit the size of droplets, and therefore the size of resulting precursor and fired particles, to less than about 80 microns.

For concrete and stone grinding and polishing, it is desirable to produce agglomerate particles with larger sizes, up to 300-500 microns. Well-known molding or replication processes can form larger agglomerate precursor particles. However, these processes require molds or precisely-machined cavity substrates or embossing tools, where each individual tooling cavity or embossing feature produces a single agglomerate particle from slurry or paste starting precursors. The necessary molding or embossing tools are expensive to produce and have finite useful lifetimes. Furthermore, the process sequence of filling, curing, hardening, and then extracting precursor particles from mold cavities limits efficiency for producing large volumes of particles. It is desirable to provide an inexpensive means for manufacturing large agglomerate particles without the need for molding or replication tools.

SUMMARY OF THE INVENTION

The instant invention is a method for making agglomerate particles, said method comprising: (a) forming a slurry of agglomerate components in a polymerizable liquid resin carrier; (b) mixing said slurry with a non-miscible fluid to form discrete dispersed droplets; (c) solidifying said droplets to form a multitude of solid particles; and (d) isolating said solid particles.

The invention also relates to a method for making agglomerate particles, said method comprising: (a) forming by mixing at high speed a slurry of mineral agglomerate components in a polymerizable liquid resin carrier; (b) mixing said slurry with a non-miscible fluid to form discrete dispersed droplets; (c) exposing the discrete dispersed droplets to UVA radiation; (c) solidifying said droplets to form a multitude of solid particles; (d) isolating said solid particles and (e) firing said particles.

The invention further relates to a method for increasing the particle size of agglomerate particles, said method comprising: (a) forming by mixing at high speed a slurry of mineral agglomerate components in a polymerizable liquid resin carrier; (b) mixing said slurry with a non-miscible fluid to form discrete dispersed droplets; (c) exposing the discrete dispersed droplets to UVA radiation; (c) solidifying said droplets to form a multitude of solid particles; and (d) isolating said solid particles.

The instant invention also is directed to a process for producing mineral agglomerates which comprises the steps of: (a) dispersing said mineral materials with mixing in a first polymerizable liquid resin solvent system which is not miscible with a second liquid thereby forming a thoroughly separated dispersion or slurry; (b) gradually and controllably adding to said dispersion or slurry said second liquid while continuing said mixing until a mass comprising said mineral materials and said second liquid phase agglomerates; (c) separating said agglomerates from said second liquid; and (d) drying and firing the resulting agglomerates.

DETAILED DESCRIPTION OF THE INVENTION

As used herein, "Agglomerate" or "agglomeration" refers to a product (or a technique) that combines micron sized particles to form larger particles which are held together by a variety of physical-chemical forces. The formation of agglomerates begins with the interfacial forces which have a cohesive effect between particles of mineral ore concentrate. These include capillary forces developed in liquid ridges between the particle surfaces. Numerous particles adhere to one another.

The instant invention is a method for making agglomerate particles, said method comprising: (a) forming a slurry of agglomerate components in a polymerizable liquid resin carrier; (b) mixing said slurry with a non-miscible fluid to form discrete dispersed droplets; (c) solidifying said droplets to form a multitude of solid particles; and (d) isolating said solid particles.

The invention also relates to a method for making agglomerate particles, said method comprising: (a) forming by mixing at high speed a slurry of mineral agglomerate components in a polymerizable liquid resin carrier; (b) mixing said slurry with a non-miscible fluid to form discrete dispersed droplets; (c) exposing the discrete dispersed droplets to UVA radiation; (c) solidifying said droplets to form a multitude of solid particles; (d) isolating said solid particles and (e) firing said particles.

The invention further relates to a method for increasing the particle size of agglomerate particles, said method comprising: (a) forming by mixing at high speed a slurry of mineral agglomerate components in a polymerizable liquid resin carrier; (b) mixing said slurry with a non-miscible fluid to form discrete dispersed droplets; (c) exposing the discrete dispersed droplets to UVA radiation; (c) solidifying said droplets to form a multitude of solid particles; and (d) isolating said solid particles.

The instant invention also is directed to a process for producing mineral agglomerates which comprises the steps of: (a) dispersing said mineral materials with mixing in a first polymerizable liquid resin solvent system which is not miscible with a second liquid thereby forming a thoroughly separated dispersion or slurry; (b) gradually and controllably adding to said dispersion or slurry said second liquid while continuing said mixing until a mass comprising said mineral materials and said second liquid phase agglomerates; (c) separating said agglomerates from said second liquid; and (d) drying and firing the resulting agglomerates.

The present invention further provides a method for manufacturing large (up to 500 microns) agglomerate particles. The agglomerate particles of the invention comprise a binder with discrete particles dispersed therein to form solid composite particles. Such particles are used, for example, in articles designed to abrade and polish hard materials such as concrete and other hard surfaces. It should be noted that the method of the invention is also applicable to making agglomerate particles used in making catalysts, adsorbents and catalyst supports via agglomeration of a slurry, dispersion or suspension of solid particles.

The method of the invention employs at least two liquid components, the liquids being mutually distinct, nonreactive, and immiscible toward one another. The first liquid functions as a carrier. One or more second liquid components, formulated as slurries, are introduced under energy-intensive agitation, causing the second liquid(s) to break up and disperse into discrete droplets carried by the carrier fluid. Agitation may occur by a simple mechanical stirring process, or by alternative high-energy fluid processes such as ultrasonication. With continued agitation, the liquid mixture persists, with dispersed liquid slurry droplets remaining discrete and separated within the carrier liquid.

The second liquid comprises slurry, combining useful particles, such as abrasive and filler particles, inorganic binder precursor particles such as glass or ceramic particles, and a temporary binder material such as a curable (radiation- or thermally-curable) liquid resin. Addition of suitable curing agents such as photoinitiators and thermoinitiators facilitate resin curing and solidification of the dispersed liquid droplets within the carrier liquid when the agitated mixture is exposed to radiation or thermal energy. Subsequently, the resulting solid dispersed droplets may be separated from the carrier liquid for further processing or for use as formed.

The method of the invention starts with selection of the first (carrier) liquid. The carrier liquid must be chemically inert and immiscible with respect to the second liquid of the invention, and must allow sufficient transmission of UV radiation or thermal energy to cause polymerization of the temporary binder in the second liquid. Liquid viscosity must be chosen to permit second fluid droplets to form and to persist under agitation. Suitable carrier liquids include cyclic silicone (i.e., cyclotetrasiloxane) fluids, fluorinated (perfluoroalkylether) oils and perfluorinated hydrocarbons.

In the second step, the second liquid components are mixed to form agglomerate precursor slurry. Agglomerate precursor slurry includes a temporary binder mixture. Temporary binder consists of a radiation- or thermally-curable liquid resin, reactive diluent, silane coupling agent, photoinitiator and/or thermal initiator. Temporary binder components are initially mixed together for 15 minutes using an electric mixer and four-bladed impeller at 300 rpm. Remaining dry powder components, including inorganic filler, sinterable glass or ceramic powder, and abrasive and/or mineral particles are then mixed into the temporary binder liquid for 10 minutes at 500 rpm.

The selected carrier liquid is contained in a transparent, heat-resistant container (e.g. borosilicate glass) and stirred with an electric mixer and four-blade impeller at a rotation speed sufficient to form a vortex extending to just above the bottom of the glass container. Agglomerate precursor slurry is then slowly introduced into the carrier liquid vortex by pouring or metered pumping. Under the shearing action of the impeller blade, the introduced agglomerate precursor slurry stream breaks into discrete slurry droplets approximately 20 μm-500 μm in size. The discrete droplets remain separated and circulate freely and in the stirred carrier liquid.

A UVA light source is directed horizontally toward the outside walls of the glass container. A shield is place between the UV lamp and the glass container, and the lamp turned on and allowed to warm up to full output illumination. The shield is then removed and the UVA light irradiates and cures the circulating agglomerate precursor slurry droplets through the glass container wall. The reaction of UVA with the photoinitiator component of the slurry produces at least partial curing of the resin. The UV-induced curing reaction produces heat, which concurrently activates the thermal intiator component of the slurry, causing the entire mass of curable resin to completely solidify, resulting in fully-cured agglomerate precursor particles.

After 5-10 minutes, the UVA lamp is shielded or turned off, the mixer stopped, and cured agglomerate precursor droplets, now solid agglomerate precursor particles, settle by gravity to the bottom of the glass container. Carrier liquid is decanted off for reuse. The layer of solid agglomerate precursor particles is spread onto absorbent sheets to remove residual carrier liquid. The agglomerate precursor particles are then placed in a gravity oven set at 95° C. and allowed to dry for 4-8 hours. Dried agglomerate precursor particles are then passed through a #20 mesh sieve. Particles not passing through #20 mesh (approximately 850 m) are collected separately or discarded.

After screening, agglomerate precursor particles may be used immediately. For example, as-produced agglomerate precursor particles may be incorporated into abrasive articles used for grinding and polishing applications where high agglomerate strength and abrasion resistance may not be necessary or desirable.

In some applications, high agglomerate strengths and abrasion resistance are necessary, such as in abrasive articles used for grinding and polishing concrete and other hard surfaces. For these applications, agglomerate precursor particles may be heated to remove the temporary binder and to subsequently cause the glass or ceramic inorganic binder material to fuse or sinter, thus holding the useful particles together in a strong, abrasion-resistant fired agglomerate particle.

For the optional firing step, screened agglomerate precursor particles are blended with fine alumina ceramic powder. The alumina powder supports the agglomerate precursor particles during firing and prevents the fired particles from sticking together during firing. The agglomerate/alumina mixture is placed in a refractory ceramic container and heated through a controlled schedule to burn out the temporary binder fuse or sinter the glass or ceramic binder.

Figure 1:
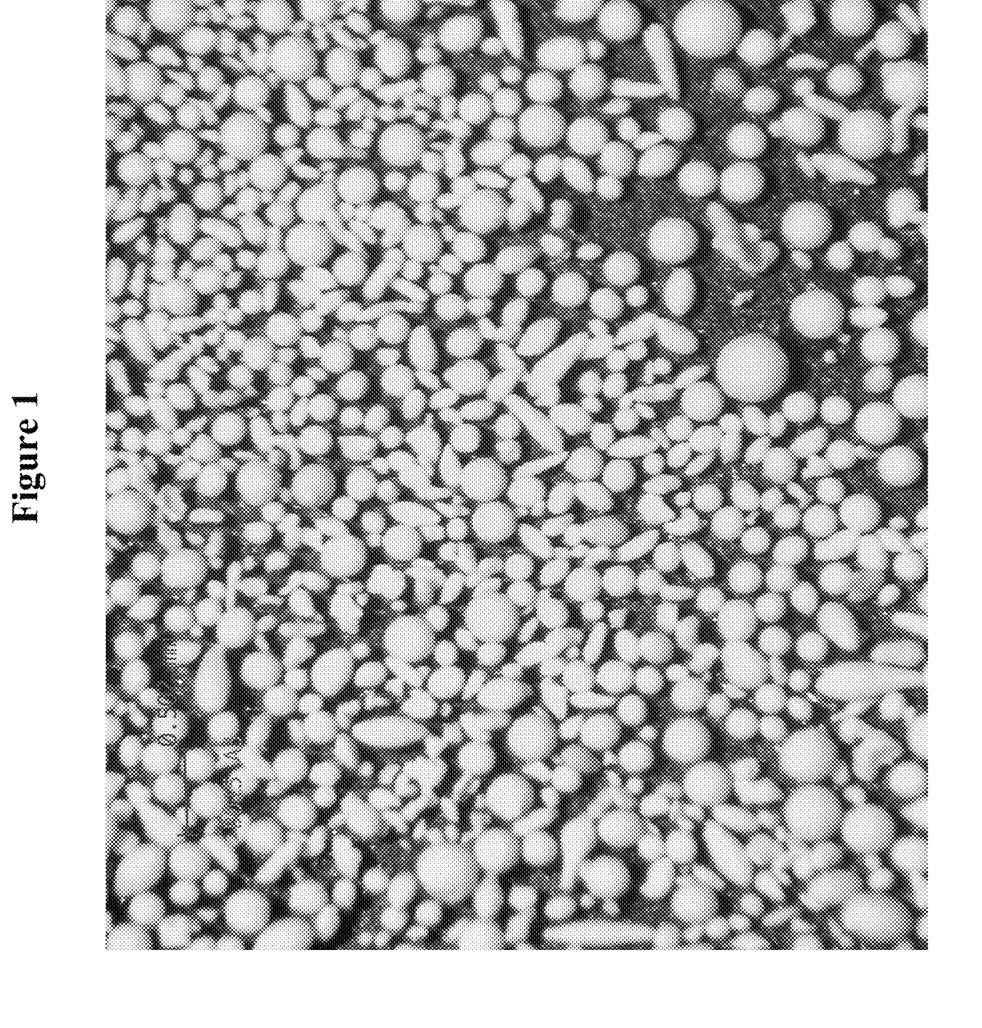
FIG. 1 show the different shapes of the agglomerated particles obtained by the process of the invention.
Figure 2:
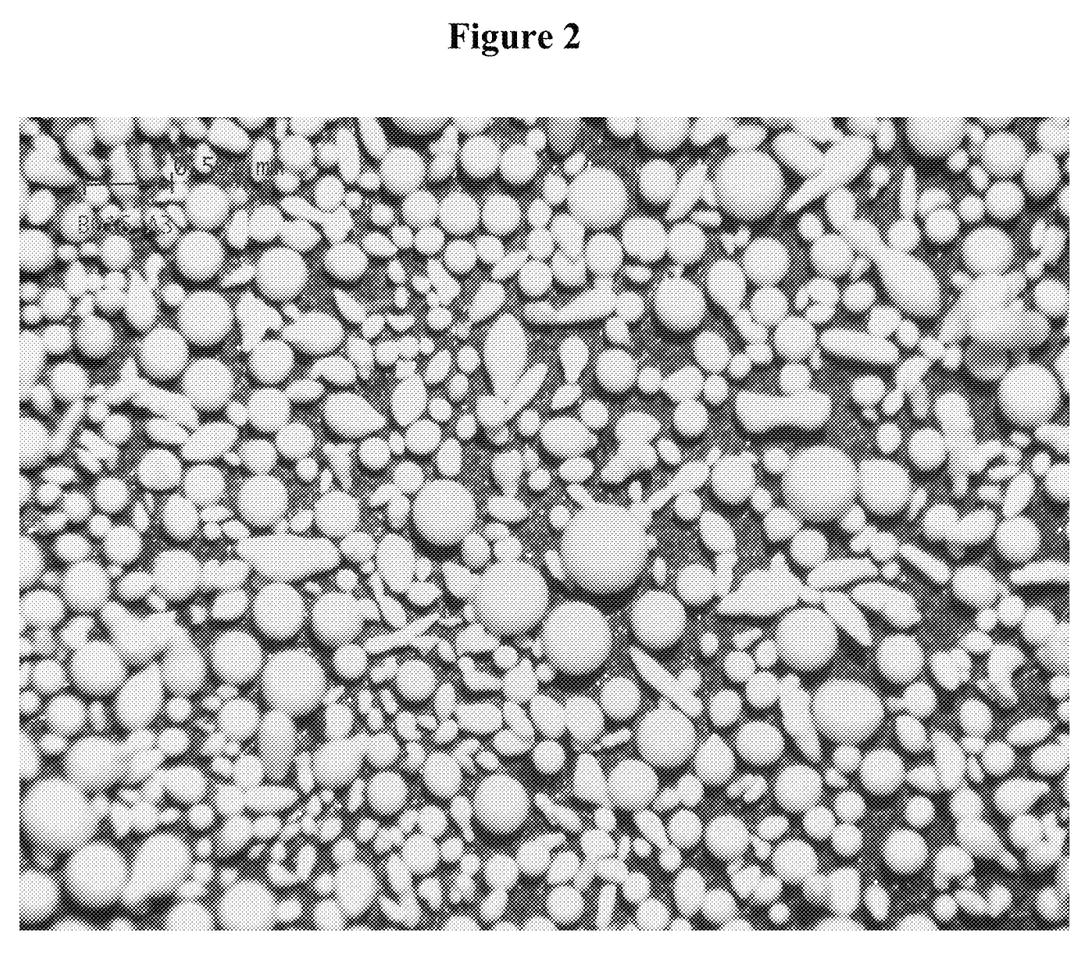
FIG. 2 is another view of the shapes of the agglomerated particles obtained by the process of the invention.

Fired agglomerate particles are variously shaped. Equiaxed shapes include sphere. Cylindrical shapes include straight and bent rods. Nonequiaxed shapes include ovaloids, ellipsoids, teardrops, and irregular hard conglomerates of variously shaped primary particles, as shown in FIG. 1 and FIG. 2.

Fired particle sizes, estimated by the largest projected linear dimension observed under an optical microscope, range from approximately 50 μm to approximately 500 μm.

The liquid resin carrier of the invention is selected from the group consisting of ethylene glycol di(meth)acrylate, hexanediol di(meth)acrylate, triethylene glycol di(meth) acrylate, trimethylolpropane tri(meth)acrylate, glycerol tri (meth)acrylate, pentaerythritol tri(meth)acrylate, ethoxylated trimethylolpropane tri(meth)acrylate, neopentyl glycol di(meth)acrylate, pentaerythritol tetra(meth)acrylate, dipentaerythritol penta(meth)acrylate, sorbitol tri(meth)acrylate, sorbitol hexa(meth)acrylate, Bisphenol A di(meth)acrylate, ethoxylated Bisphenol A di(meth)acrylates, acrylated epoxy oligomers, and mixtures thereof.

The liquid polymerizable resin carrier also may include reactive diluents which typically include compounds with ethylenic unsaturation. Suitable such compounds include a (meth)acrylate, a vinyl ether, a (meth)allyl ether, or mixtures or copolymers thereof. Examples of (meth)acrylate-functional reactive diluents include 4-tert-butylcyclohexyl acrylate, 4-tert-butylcyclohexyl methacrylate di-(trimethyolpropane tetraacrylate), di-(trimethyolpropane tetramethacrylate), di(pentaerythritol hexaacrylate), di-(pentaerythritol hexamethacrylate), pentaerythritol tetraacrylate, and pentaerythritol tetramethacrylate. Examples of vinyl ether reactive diluents include di-(trimethyolpropane tetravinyl ether), di-(pentaerythritol hexavinyl ether), and pentaerythritol tetravinyl ether. Examples of (meth)allyl ether reactive diluents include di-(trimethyolpropane tetraallyl ether), di-(trimethyolpropane tetramethallyl ether), di(pentaerythritol hexaallyl ether), di-(pentaerythritol hexamethallyl ether), pentaerythritol tetraallyl ether, and pentaerytlritol tetramethallyl ether. Preferred reactive diluent compounds are (meth)acrylate functional, which include acrylate functionality and methacrylate functionality. Preferred reactive diluents include (meth)acrylate functional compounds. Of these, the preferred reactive diluent compounds are di-(trimethyolpropane tetraacrylate) and di-(trimethyolpropane tetramethacrylate).

The mineral particles useful in carrying the invention are selected from the group consisting of fused aluminum oxide, white fused alumina, heat-treated aluminum oxide, brown aluminum oxide, ceramic aluminum oxide, heated treated aluminum oxide, silicon carbide, natural diamond, synthetic diamond, cubic boron nitride, boron carbide, titanium carbide, garnet, fused alumina-zirconia, ceramic alumina-zirconia, diamond, zirconia, and combinations thereof.

The photoinitiators useful in carrying the invention are selected from the group consisting of α-methylbenzoin; α-phenylbenzoin; α-allylbenzoin; α-benzylbenzoin; benzoin ethers such as benzil dimethyl ketal, benzoin methyl ether, benzoin ethyl ether, benzoin n-butyl ether; acetophenone, 2-hydroxy-2-methyl-1-phenyl-1-propanone, 1-hydroxycyclohexyl phenyl ketone; 2-methyl-1-[4-(methylthio) phenyl]-2-(4-morpholinyl)-1-propanone, 2-benzyl-2-(dimethyl-amino)-1-[4-(4-morpholinyl)phenyl]-1-butanone, pivaloin ethyl ether, anisoin ethyl ether; anthraquinones, such as anthraquinone, 2-ethylanthraquinone, 1-chloroanthraquinone, 1,4-dimethylanthraquinone, 1-methoxyanthraquinone, benzanthraquinonehalomethyltriazines, benzophenone, bis($\eta_5$-2,4-cyclopentadien-1-yl)bis[2,6-difluoro-3-(1H-pyrrol-1-yl)phenyl]-titanium; 4-bromomethylnitrobenzene, mono- and bis-acylphosphines bis(2,4,6-trimethyl-benzoyl)-phenylphosphineoxide and mixtures thereof.

The thermal initiators of the invention are selected from the group consisting of 4,4'-azobis(4-cyanovaleric acid), 4,4'-azobis(4-cyanovaleric acid), 1,1'-azobis-(cyclohexanecarbonitrile), 2,2'-azobis(2-methylpropionamidine) dihydrochloride granular, 2,2'-azobis(2-methylpropionitrile), 2,2'-azobis(2-methylpropionitrile) recrystallized, azobisisobutyronitrile, 2,2'-azobis(2,4-dimethyl-valeronitrile), tert-butyl hydroperoxide, tert-butyl peracetate, cumene hyperoxide, 2,5-di-(tert-butylperoxy)-2,5-dimethyl-3-hexyne, dicumyl peroxide, 2,5-bis(tert-butylperoxy)-2,5-di-methyl-hexane, 2,4-pentanedione peroxide, 1,1-bis(tert-butylperoxy)-3,3,5-trimethylcyclohexane, 1,1-bis(tert-butylperoxy) cyclohexane, benzoyl per-oxide, 2-butanone peroxide, tert-butyl per-oxide, lauroyl peroxide, tert-butyl peroxybenzoate, tert-butylperoxy 2-ethylhexyl carbonate, tert-butyl hyperoxide, ammonium persulfate, hydroxymethane-sulfinic acid monosodium salt dihydrate, potassium persulfate, sodium persulfate and mixtures thereof.

The silane coupling agents useful in carrying the invention are selected from the group consisting of 3-mercaptopropylmethyldimethoxisilane, (3-glycidoxypropyl)methyldiethoxy-silane, (3-glycidoxypropyl)tri-methoxysilane, (3-trimethoxysilylpropyl)diethylenetriamine, (N,N-diethyl-3-aminopropyl)tri-ethoxysilane, 3-aminopropylmethyldiethoxysilane, 3-amino-propyltriethoxysilane, 3-amino-propyltrimethoxysilane, 3-chloropropylmethyldichlorosilane, 3-chloropropylmethyldimethox-ysilane, 3-chloropropyltrichlorosilane, 3-chloropropyltriethoxy-silane, 3-chloropropyltrimethoxy-silane, 3-mercaptopropyltriethoxysilane, 3-mercaptopropyl-trimethoxysilane, bis[3-(triethoxy-silyl)propyl]-tetrasulfide, chloromethyltrichlorosilane, chloro-methyltriethoxysilane, chloro-methyltrimethoxysilane, methacryloxypropyltrimethoxysilane, methyltriacetoxysilane, methyl-tris(methylethylketoxime)silane, N-(2-aminoethyl)-3-amino-propylmethyldimethoxysilane, N-(2-aminoethyl)-3-aminopropyltrimethoxysilane, N-methyl-aminopropyltrimethoxysilane, phenyltris(methylethylketoximino)silane, tetrakis(methylethylketoximino)silane, trifluoropropyl-methyldimethoxysilane, trifluoropropyltrimethoxysilane, ureidopropyltrimethoxysilane, vinyldi-methylethoxysilane, vinylmethylbis(methylethyl-keto-ximino)silane, vinyltrichlorosilane, vinyltriethoxysilane, vinyltrimethoxysilane, vinyltris(2-methoxyethoxy)silane, vinyltris(methylethyl-ketoximino) silane and gamma-methacryl-oxy-propyltrimethoxysilane and mixtures thereof.

The non-miscible fluid is selected from the group consisting of silicones and fluorinated oils. The silicones are selected from the group consisting of cyclotetrasiloxane fluids, cyclopentasiloxane fluids, cyclohexasiloxane fluids and mixtures thereof. The fluorinated oils are (perfluroalkylether) oils and perfluorinated hydrocarbons.

Agglomerate Examples a-F (See Table 2)

The following examples are intended to demonstrate the usefulness of the agglomerates of the invention, methods of preparation and their use in the abrasive industry and should not be construed to limit the scope of the invention in anyway.

Agglomerate List of Materials and Abbreviations

AR: (acrylate resin) trimethylol propane triacrylate, commercially available under the trade designation "GM 6300"
RD: (reactive diluent) 4-tert-butylcyclohexyl acrylate, commercially available from BASF under the trade designation "Laromer TBCH"
SC: (silane coupling agent) gamma-methacryloxypropyltrimethoxysilane, commercially available from Momentive Performance Materials under the trade designation "Silquest A-174NT"
PI: (photo initiator) bis(2,4,6-trimethylbenzoyl)-pehnylphosphineoxide, commercially available from Ciba under the tradename "Irgacure 819"
TI: (thermal initiator) 2,2'-azobis(2,4-dimethylvaleronitrile), commercially available from Dupont under the trade designation "Vazo 52"
ABS: (glass powder) alumino-boro-silicate glass powder, 325 mesh, commercially available from Specialty Glass Inc. under the trade designation "SP1086"
DP1: (diamond powder 1) diamond powder, 1 um, commercially available from Pinnacle Abrasives under the trade designation "Type MPP 00-02"
DP2: (diamond powder 2) diamond powder, 3 um, commercially available from Pinnacle Abrasives under the trade designation "Type MPP 02-04"
DP3: (diamond powder 3) diamond powder, 10 um, commercially available from Pinnacle Abrasives under the trade designation "Type MPP 08-12"

DP4: (diamond powder 4) diamond powder, 45 um, commercially available from Pinnacle Abrasives under the trade designation "Type CMD 325/400 D46"
DP5: (diamond powder 5) diamond powder, 180 um, commercially available from Pinnacle Abrasives under the trade designation "Type CMD 80/100 D181"
DP6: (diamond powder 6) diamond powder, 350 um, commercially available from Pinnacle Abrasives under the trade designation "Type CMD 45/50 D356"
DP7: (diamond powder 7) diamond powder, 600 um, commercially available from Pinnacle Abrasives under the trade designation "Type CMD 35/40 D602"
AP: (alumina powder) platey white alumina, commercially available from Fujimi Corp. under the trade designation "PWA3"
GC320: silicon carbide powder, 320 mesh, commercially available from Fujimi Corporation under the trade designation "GC320"
WA320: alumina powder, 320 mesh, commercially available from Fujimi Corporation under the trade designation "WA320:
FO320: zircon powder, 320 mesh, commercially available under from Fujimi Corporation under the trade designation "FO320"
PWA40: alumina powder, 40 micron, commercially available from Fujimi under the trade designation "PWA40"
C320: silicon carbide powder, 320 mesh, commercially available from Fujimi under the trade designation "C320"
SiC: silicon carbide powder, 120 mesh, commercially available from Treibacher under the trade designation "Type EG25"
TiB2: titanium diboride powder, 400 mesh, commercially available from Fujimi Corporation under the trade designation "TiB2 400"
B4C: boron carbide powder, F600, commercially available from Fujimi Corporation under the trade designation "B4C F600"
GC4000: silicon carbide powder, #4000, commercially available from Fujimi Corporation under the trade designation "GC4000"
FO4000: zircon powder, #4000, commercially available from Fujimi Corporation under the trade designation "FO4000"
WA4000: alumina powder, #4000, commercially available from Fujimi Corporation under the trade designation "WA4000"
C4000: silicon carbide powder, #4000, commercially available from Fujimi Corporation under the trade designation "C4000"
SF: (silicone fluid) cyclotetrasiloxane, commercially available from Dow Corning under the trade designation "Xiameter PMX-0244"

Approximately 200 grams of agglomerate precursor slurry (APS) was formulated for each of the listed Examples.

Temporary binder (TB) components listed in Table 1 were combined in a 1 L plastic beaker. An IKA RW20 electric mixer with a 2" four-blade impeller were used to mix components at 300 rpm for ~15 minutes until all solid materials dissolved.

Agglomerate precursor slurry (APS) components listed in Table 2 were then added into the temporary binder liquid and mixed for 10 minutes at 500 rpm. Table 3 lists the abrasive mineral particles referred to in Table 2.

Approximately 300 grams of SF was poured into a 600 ml Pyrex™ beaker and stirred with the 2" electric mixer at 500 rpm. The mixed agglomerate precursor slurry was then poured into the vortex formed by stirring the SF. The slurry stream was maintained at ~½" diameter. Under the shearing action of the blade mixer, the agglomerate precursor slurry stream broke into discrete agglomerate precursor slurry particles approximately 20μ-500μ diameter, which remained separate and suspended in the stirred SF liquid.

A Sunray model 400SM UVA light source, obtained from Uvitron International Inc., was placed 8" away from the glass beaker with the UV bulb oriented parallel to the beaker and mixer stirring rod axes. The UV light was directed through the beaker wall, switched on to "High" power and allowed to continuously irradiate the glass beaker contents for 8 minutes.

As a result of the ultraviolet radiation exposure, the agglomerate precursor slurry particles cured to form rigid, solid agglomerate precursor particles (APPs). The light source and mixer motor were shut off, and APPs were allowed to settle to the bottom of the glass beaker.

After ~5 minutes settling time, the SF was decanted from over the APP layer. APPs were dispensed and spread onto 4 layers of paper toweling to remove residual SF. The APPs were then placed into a gravity oven set at 200° F. and allowed to dry overnight.

Dried agglomerate precursor particles (APPs) were passed through a #20 mesh sieve. Particles not passing through #20 mesh (approximately 850 μm openings) were discarded.

Approximately 160 grams of APPs were placed in a quart-size glass jar, and approximately 80 grams of AP was added to the jar. The jar was tumbled and rotated by hand for approximately 5 minutes to blend the APPs and AP together.

The blended APPs and AP material was poured into a 5"×8"×2" refractory alumina saggar to a depth of approximately ⅝". The saggar containing APPs and AP was placed into a Yamato 410CR muffle furnace and fired according to the following schedule: room temperature to 400° C. in 3.2 hrs; 1.0 hrs at 400° C.; 400° C. to 730° C. in 2.7 hrs; 1.0 hrs at 730° C.; furnace cool to room temperature. After cooling, the fired agglomerate particles (FAPs) and AP was placed in a gallon-sized plastic bag for subsequent processing and use.

The present examples describes an improved method for producing large agglomerate particles.

TABLE 1

| Temporary binder (TB) | | | |
|---|---|---|---|
| Temporary Binder | | TB1 | TB2 |
| Component | Material | (wt %) | (wt %) |
| AR (acrylate resin) | trimethylolpropanetriacrylate | 72.5 | 76.5 |
| RD (reactive diluent) | 4-tert-butylcyclohexyl acrylate | 25.0 | 20.0 |
| PI (photoinitiator) | bis(2,4,6-trimethylbenzoyl)-phenylphosphineoxide | 1.0 | 1.0 |
| TI (thermal initiator) | 2,2'-azobis(2,4-dimethylvaleronitrile) | — | 0.2 |
| SC (silane couplling agent) | gamma-methacryloxypropyltrimethoxysilane | 1.5 | 1.5 |

TABLE 2

| Agglomerate precursor slurry components: | | | | | | | |
|---|---|---|---|---|---|---|---|
| Agglomerate Precursor Slurry | | A | B | C | D | E | F |
| Component | Material | (wt %) | (wt %) | (wt %) | (wt %) | (wt %) | (wt %) |
| ABS (glass powder) | alumino-boro-silicate glass | 38.5 | 38.3 | 36.4 | 36.4 | 40.7 | 38.0 |
| Agglomerate mineral Particle | Ref. Table 3 | 13.8 | 13.7 | 15.8 | 15.8 | 14.6 | 16.5 |
| AF (alumina filler) | alumina filler, 3 μm | 13.8 | 13.7 | 11.5 | 11.5 | 14.1 | 12.0 |
| TB1 (temporary binder) | Ref. Table 1 | 33.9 | — | 36.3 | — | 30.6 | 33.5 |
| TB2 (temporary binder) | Ref. Table 1 | — | 34.3 | — | 36.3 | — | — |

TABLE 3

Agglomerate mineral particles (AMP)

| Mineral Example | Mineral particle | Mineral type | Agglomerate Precursor Slurry |
|---|---|---|---|
| 1 | GC320 | Green silicon carbide #320 (29 μm) | A |
| 2 | WA320 | White aluminum oxide #320 (29 μm) | A |
| 3 | F0320 | Zircon #320 (29 μm) | A |
| 4 | PWA40 | Platelet aluminum oxide (40 μm) | A |
| 5 | C320 | Black silicon carbide #320 (29 μm) | B |
| 6 | SiC | Black silicon carbide #120 (106 μm) | B |
| 7 | TiB2 | Titanium diboride #400 (17 μm) | B |
| 8 | B4C | Boron carbide F600 (17 μm) | B |
| 9 | GC4000 | Green silicon carbide #4000 (3 μm) | C |
| 10 | F04000 | Zircon #4000 (3 μm) | C |
| 11 | WA4000 | White aluminum oxide #4000 (3 μm) | C |
| 12 | C4000 | Black silicon carbide #4000 (3 μm) | D |
| 13 | CMD45 | Diamond 325/400 (45 μm) | E |
| 14 | MPP3 | Diamond F1200 (3 μm) | F |

Additional Example G

Procedure for Making Agglomerate Precursor Particles (APPs)

TABLE 4

Temporary binder (TB):

| | | |
|---|---|---|
| AR | 48.42 g | (acrylate resin) trimethylol propane triacrylate |
| RD | 16.75 g | (reactive diluent) 4-tert-butylcyclohexyl acrylate |
| PI | 0.67 g | (photo initiator) bis(2,4,6-trimethylbenzoyl)-phenylphosphineoxide |
| SC | 1.00 g | (silane coupling agent) gamma-methacryloxypropyltrimethoxysilane |
| TI | 0.13 g | (thermal initiator) 2,2'-azobis(2,4-dimethylvaleronitrile), |

TABLE 5

Agglomerate precursor slurry components:

| | | |
|---|---|---|
| TB | 67.0 g | |
| ABS | 76.0 g | (glass powder) alumino-boro-silicate glass powder, 325 mesh |
| DP | 33.0 g | (diamond powder) |
| AP | 24.0 g | (alumina powder) platey white alumina |

Temporary binder (TB) components listed in Table 4 were combined in a 1 L plastic beaker. An IKA RW20 electric mixer with a 2" four-blade impeller were used to mix components at 300 rpm for ~15 minutes until all solid materials dissolved. Agglomerate precursor slurry components TB, ABS, DP, AP listed in Table 5 were then added into the temporary binder liquid and mixed for 10 minutes at 500 rpm.

Approximately 300 grams of SF was poured into a 600 ml Pyrex™ beaker and stirred with the 2" electric mixer at 500 rpm. The mixed agglomerate precursor slurry was then poured into the vortex formed by stirring the SF. The slurry stream was maintained at ~⅛" diameter. Under the shearing action of the blade mixer, the agglomerate precursor slurry stream broke into discrete agglomerate precursor slurry particles approximately 20μ-500μ diameter, which remained separate and suspended in the stirred SF liquid.

A Sunray model 400SM UVA light source, obtained from Uvitron International Inc., was placed 8" away from the glass beaker with the UV bulb oriented parallel to the beaker and mixer stirring rod axes. The UV light was directed through the beaker wall, switched on to "High" power and allowed to continuously irradiate the glass beaker contents for 8 minutes.

As a result of the ultraviolet radiation exposure, the agglomerate precursor slurry particles cured to form rigid, solid agglomerate precursor particles (APPs). The light source and mixer motor were shut off, and APPs were allowed to settle to the bottom of the glass beaker. After ~5 minutes settling time, the SF was decanted from over the APP layer. APPs were dispensed and spread onto 4 layers of paper toweling to remove residual SF. The APPs were then placed into a gravity oven set at 200° F. and allowed to dry overnight.

Procedure for Making Fired Agglomerate Particles (FAPs)

Dried agglomerate precursor particles (APPs) were passed through a #20 mesh sieve. Particles not passing through #20 mesh (approximately 850 μm openings) were discarded.

Approximately 160 grams of APPs were placed in a quart-size glass jar, and approximately 80 grams of AP was added to the jar. The jar was tumbled and rotated by hand for approximately 5 minutes to blend the APPs and AP together.

The blended APPs and AP material was poured into a 5"×8"×2" refractory alumina saggar to a depth of approximately ⅝". The saggar containing APPs and AP was placed into a Yamato 410CR muffle furnace and fired according to the following schedule: room temperature to 400° C. in 3.2 hrs; 1.0 hrs at 400° C.; 400° C. to 730° C. in 2.7 hrs; 1.0 hrs at 730° C.; furnace cool to room temperature. After cooling, the fired agglomerate particles (FAPs) and AP was placed in a gallon-sized plastic bag for subsequent processing and use.

Fired agglomerate particles were variously shaped. Equi-axed shapes included spheres. Cylindrical shapes included straight and bent rods. Nonequiaxed shapes included ovaloids, ellipsoids, teardrops and irregular hard conglomerates of variously shaped primary particles (FIG. 1).

Fired particle sizes, estimated by the largest projected linear dimension observed under an optical microscope, ranged from approximately 50 μm to approximately 400 μm.

All patents, patent applications and publications cited in this application including all cited references in those patents, applications and publications, are hereby incorporated by reference in their entirety for all purposes to the same extent as if each individual patent, patent application or publication were so individually denoted.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:

1. A method for making agglomerate particles, said method comprising:
   (a) forming a slurry of agglomerate components in a temporary binder comprising a polymerizable liquid resin carrier;
   (b) mixing said slurry with a non-miscible fluid to form discrete dispersed droplets;
   (c) solidifying said droplets to form a multitude of solid particles; and
   (d) isolating said solid particles.

2. The method of claim 1, wherein said temporary binder comprising a polymerizable liquid resin carrier is thermally curable.

3. The method of claim 1, wherein said temporary binder comprising a polymerizable liquid resin carrier is radiation curable.

4. The method of claim 1, wherein said liquid resin carrier is selected from the group consisting of ethylene glycol di(meth)acrylate, hexanediol di(meth)-acrylate, triethylene glycol di(meth)acrylate, trimethylolpropane tri(meth)acrylate, glycerol tri(meth)acrylate, pentaerythritol tri(meth)acrylate, ethoxylated trimethylolpropane tri-(meth)acrylate, neopentyl glycol di(meth)-acrylate, pentaerythritol tetra(meth)acrylate, dipentaerythritol penta(meth)acrylate, sorbitol tri(meth)acrylate, sorbitol hexa(meth)acrylate, Bisphenol A di(meth)acrylate, ethoxylated Bis-phenol A di(meth)acrylates, acrylated epoxy oligomers, and mixtures thereof.

5. The method of claim 1, wherein said agglomerate particles are selected from the group consisting of fused aluminum oxide, white fused alumina, heat-treated aluminum oxide, brown aluminum oxide, ceramic aluminum oxide, heated treated aluminum oxide, silicon carbide, natural diamond, synthetic diamond, cubic boron nitride, boron carbide, titanium carbide, garnet, fused alumina-zirconia, ceramic alumina-zirconia, diamond, zirconia, and combinations thereof.

6. The method of claim 4 wherein said liquid resin carrier further includes a material selected from the group consisting of a reactive diluent, a photoinitiator, a thermal initiator, a silane coupling agent and mixtures thereof.

7. The method of claim 6, wherein said reactive diluent is selected from the group consisting of 4-tert-butylcyclohexyl acrylate, 4-tert-butylcyclohexyl methacrylate, di-(tri-methyolpropane tetraacrylate), di-(trimethyolpropane tetramethacrylate), di-(pentaerythritol hexaacrylate), di-(pentaerythritol hexamethacrylate), pentaerythritol tetraacrylate, pentaery-thritol tetramethacrylate, di-(trimethyolpropane tetravinyl ether), di-(pentaerythritol hexavinyl ether), pentaerythritol tetravinyl ether, di-(trimethyolpropane tetraallyl ether), di(trimethyol-propane tetramethallyl ether), di(pentaerythritol hexaallyl ether), di-(pentaerythritol hexa-methallyl ether), pentaerythritol tetraallyl ether, pentaerytlritol tetramethallyl ether and mixtures thereof.

8. The method of claim 6, wherein said photoinitiator is selected from the group consisting of α-methylbenzoin; α-phenylbenzoin; α-allylbenzoin; α-benzylbenzoin; benzoin ethers such as benzil dimethyl ketal, benzoin methyl ether, benzoin ethyl ether, benzoin n-butyl ether; acetophenone, 2-hydroxy-2-methyl-1-phenyl-1-propanone, 1-hydroxycyclohexyl phenyl ketone; 2-methyl-1-[4-(methylthio)phenyl]-2-(4-morpholinyl)-1-propanone, 2-benzyl-2-(dimethylamino)-1-[4-(4-morpholinyl)phenyl]-1-butanone, pivaloin ethyl ether, anisoin ethyl ether; anthraquinones, such as anthraquinone, 2-ethylanthraquinone, 1-chloroanthraquinone, 1,4-di-methylanthraquinone, 1-methoxyanthraquinone, benzanthraquinone-halo-methyltriazines, benzo-phenone, bis($\eta_5$-2,4-cyclopentadien-1-yl)bis[2,6-difluoro-3-(1H-pyrrol-1-yl)phenyl]-titanium; 4-bromomethylnitrobenzene, mono- and bis-acylphosphines bis-(2,4,6-trimethyl-benzoyl)phenylphosphineoxide and mixtures thereof.

9. The method of claim 6, wherein said thermal initiator is selected from the group consisting of 4,4'-azobis(4-cyanovaleric acid), 4,4'-azobis(4-cyanovaleric acid), 1,1'-azobis-(cyclohexanecarbonitrile), 2,2'-azobis(2-methylpropionamidine) dihydrochloride granular, 2,2'-azobis(2-methylpropionitrile), 2,2'-azobis(2-methylpropionitrile) recrystallized, azobisiso-butyronitrile, 2,2'-azobis(2,4-dimethyl-valeronitrile), tert-butyl hydroperoxide, tert-butyl peracetate, cumene hydroperoxide, 2,5-di-(tert-butylperoxy)-2,5-dimethyl-3-hexyne, dicumyl peroxide, 2,5-bis(tert-butylperoxy)-2,5-di-methylhexane, 2,4-pentanedione peroxide, 1,1-bis(tert-butylperoxy)-3,3,5-trimethylcyclohexane, 1,1-bis(tert-butylperoxy)cyclohexane, benzoyl peroxide, 2-butanone peroxide, tert-butyl per-oxide, lauroyl peroxide, tert-butyl peroxybenzoate, tert-butylperoxy 2-ethylhexyl carbonate, tert-butyl hydroperoxide, ammonium persulfate, hydroxymethane-sulfinic acid monosodium salt dihydrate, potassium persulfate, sodium persulfate and mixtures thereof.

10. The method of claim 6, wherein said silane coupling agent is selected from the group consisting of 3-mercaptopropylmethyldimethoxisilane, (3-glycidoxy-propyl)methyldiethoxy-silane, (3-glycidoxypropyl)tri-methoxysilane, (3-trimethoxysilylpropyl)-diethylenetriamine, (N,N-diethyl-3-aminopropyl)tri-ethoxysilane, 3-aminopropylmethyldiethoxysilane, 3-amino-propyltriethoxysilane, 3-amino-propyltrimethoxysilane, 3-chloropropylmethyldichlorosilane, 3-chloropropylmethyldimethox-ysilane, 3-chloropropyltrichlorosilane, 3-chloropropyltriethoxy-silane, 3-chloropropyltrimethoxy-silane, 3-mercaptopropyltriethoxysilane, 3-mercaptopropyl-trimethoxysilane, bis[3-(triethoxy-silyl)propyl]-tetrasulfide, chloromethyltrichlorosilane, chloromethyltriethoxysilane, chloro-methyltrimethoxysilane, methacryloxypropyltrimethoxysilane, methyltriacetoxysilane, methyl-tris(methylethylketoxime)silane, N-(2-aminoethyl)-3-amino-propylmethyldimethoxysilane, N-(2-aminoethyl)-3-aminopropyltrimethoxysilane, N-methylaminopropyltrimethoxysilane, phenyltris(methylethylketoximino)-silane, tetrakis(methylethylketoximino)silane, trifluoropropyl-methyldimethoxysilane, trifluoropropyltrimethoxysilane, ureidopropyltrimethoxysilane, vinyldi-methylethoxysilane, vinyl-methylbis(methylethyl-keto-ximino)silane, vinyltrichlorosilane, vinyltriethoxysilane, vinyltrimethoxysilane, vinyltris(2- methoxyethoxy)silane, vinyltris(methylethyl-ketoximino) silane and gamma-methacryl-oxy-propyltrimethoxysilane and mixtures thereof.

11. The method of claim 1, wherein said non-miscible fluid is selected from the group consisting of silicones and fluorinated oils.

12. The method of claim 11, wherein said silicones are selected from the group consisting of cyclotetrasiloxane fluids, cyclopentasiloxane fluids, cyclohexasiloxane fluids and mixtures thereof.

13. The method of claim 11, wherein said fluorinated oils are (perfluroalkylether) oils and perfluorinated hydrocarbons.

14. The method of claim 1, wherein said particles are further fired in a temperature range of about 400° C. to about 730° C.

15. The method of claim 1, wherein said agglomerates have a particle size in the range of 20 μm-500 μm.

16. A method for making agglomerate particles, said method comprising:
(a) forming by mixing at high speed a slurry of mineral agglomerate components in a polymerizable liquid resin carrier;
(b) mixing said slurry with a non-miscible fluid to form discrete dispersed droplets;
(c) exposing the discrete dispersed droplets to UVA radiation;
(c) solidifying said droplets to form a multitude of solid particles; and
(d) isolating said solid particles.

17. The method of claim 16, wherein said particles are further fired at a temperature range of about 400° C. to about 730° C.

18. A method for increasing the particle size of agglomerate particles, said method comprising:
(a) forming by mixing at high speed a slurry of mineral agglomerate components in a polymerizable liquid resin carrier;
(b) mixing said slurry with a non-miscible fluid to form discrete dispersed droplets;
(c) exposing the discrete dispersed droplets to UVA radiation;
(d) solidifying said droplets to form a multitude of solid particles; and
(e) isolating said solid particles.

* * * * *